ENDLESS TAPE CARTRIDGE

Filed Oct. 29, 1963

INVENTORS
KENNETH W. STARK
WILLIAM A. BURTON

BY [signature]
[signature]
ATTORNEYS

United States Patent Office 3,295,782
Patented Jan. 3, 1967

3,295,782
ENDLESS TAPE CARTRIDGE
Kenneth W. Stark and William A. Burton, Hyattsville, Md., assignors to the United States of America as represented by the Administrator of the National Aeronautics and Space Administration
Filed Oct. 29, 1963, Ser. No. 319,893
8 Claims. (Cl. 242—55.19)

The invention described herein may be manufactured and used by or for the Government of the United States of America for governmental purposes without the payment of any royalties thereon or therefor.

This invention relates generally to a tape cartridge, and more particularly to a cartridge having storage capacity for 1000 feet or more of endless-loop magnetic tape.

The cartridge comprising the present invention is primarily adapted for use in high-speed, endless-loop tape recorders requiring a large data storage capacity. The function of the tape cartridge is to store the recording medium upon which the desired data is to be recorded, while simultaneously permitting smooth and rapid unwinding and rewinding of the tape about the storage reel. Cartridges of various types have been in existence for many years; for instance, the film reels which were developed for use in early motion-picture projection. These reels were generally employed in pairs with the finite length film being originally wound about the first reel and being driven by means of a spocket wheel assembly through the motion-picture projector and wound about the second reel. Rewinding of the film about the first reel was necessary prior to again showing the film.

The development of tape recorders required a more refined type of tape cartridge. The specially treated tape utilized with recording devices required a tape cartridge wherein unwinding and rewinding of the tape could be accomplished at high rates of speed without inducing strain which could impair, damage, or break the tape, and wherein the tape would travel at a constant linear speed with a minimum of fluctuations. Further, to eliminate use of a second reel, reversal mechanisms, and end-of-tape sensors, a single storage reel having a large capacity whereon the tape could simultaneously be unwound and rewound was needed.

The advent of modern telemetry systems has placed new demands upon tape recorders and the cartridges associated therewith. For example, the data storage and transmission system for a satellite requires a tape cartridge capable of storing a tape of sufficient length to handle the tremendous amount of data being generated and measured by the satellite sensors; the cartridge must be extremely reliable and durable for it will be in continuous use for periods of months and perhaps years; it must have low power consumption; and it must be compactly designed to meet the size, weight, and environmental requirements of the satellite.

Accordingly, it is an object of the instant invention to provide a new and improved tape cartridge having storage capacity for 1000 feet or more of endless-loop magnetic tape.

It is another object of this invention to provide a novel tape cartridge of large storage capacity wherein the slippage friction between adjacent tape convolutions and fluctuations in linear tape speed during the unwinding and rewinding of the tape about the reel are minimized.

The foregoing and other objects are attained in the present invention through the provision of a tape cartridge consisting essentially of a stationary roller mounting ring; an array of tape support rollers circumferentially spaced about the ring and extending radially therefrom; and a rotatably mounted, circular tape reel positioned concentrically with respect to the mounting ring. The spirally coiled tape pack is arranged about the reel with the bottom edges of the tape wraps, or convolutions, resting on the tape support rollers. The rollers and the reel are both mounted in duplex bearings for idle rotation with respect to the stationary mounting ring. There are no positive drive means associated with the cartridge components; the reel and rollers being set in motion by the moving tape which is driven by means such as a capstan assembly positioned in the path of travel of the tape.

The circular tape reel is provided at its periphery with a depending, tapered surface. Each of the plurality of tape support rollers is provided with an inclined surface on its inner end which in cooperation with the tapered surface of the reel enables the innermost tape convolution to be smoothly withdrawn from the cartridge without binding. Outwardly from the inclined surface the rollers, in the preferred embodiment, comprise a series of steps progressively increasing in diameter from the inner to the outer end. These steps serve to decrease slippage friction between the adjacent layers of tape by imparting a radial expanding force to the tape convolutions, while at the same time exerting a frictional drag on the tape convolutions passing thereover to facilitate rewinding the tape on the reel.

The outer steps of the rollers may also be provided with a roughened surface so as to increase the frictional drag of the idling rollers on the tape, thereby insuring against any slack or looseness occurring in the outermost convolution of the coil as the tape enters the cartridge for rewinding. The idler rollers further include a raised rim on the outer end of each of the rollers to aid in guiding the outer tape convolution and restraining radial expansion of the tape coil as it is being wound about the reel.

The spirally coiled tape pack is wrapped onto the reel and rollers by starting the first wrap or convolution at the tapered edge of the reel and the inner, inclined surface of the rollers. Successive wraps are built up progressively towards the outer edge of the rollers until the entire length of tape is wound about the reel. The two ends of the tape are then brought up through a tape cover plate and are spliced together to form a cross-over loop. The cross-over loop is then threaded or passed about a capstan assembly which leads the tape past the magnetic heads of the recorder. In operation of the cartridge, the innermost tape wrap is drawn from the reel by the capstan assembly and the tape is rewound back onto the outer layer of the tape pack by the frictional drag of the idler rollers and by the residual slippage friction between adjacent coil convolutions. The linear tape speed may be varied by varying the capstan r.p.m.

Other objects and many of the attendant advantages of this invention will be readily appreciated as the same becomes better understood by reference to the following detailed description when considered in conjunction with the accompanying drawings, wherein.

Figure 1:
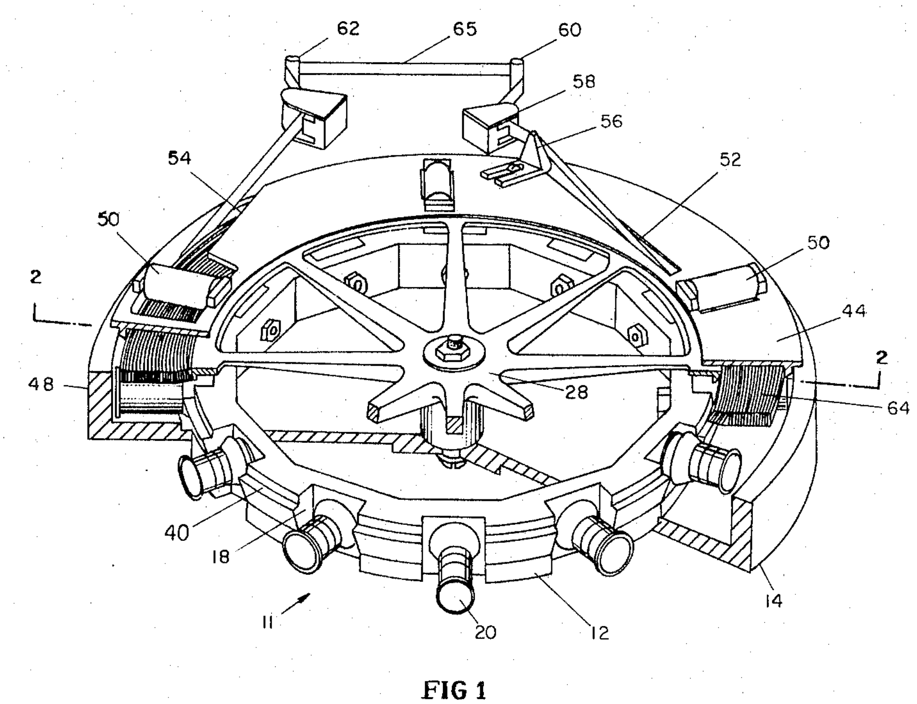
FIG. 1 is an isometric view of the tape cartridge, partly broken away, comprising the instant invention.

Referring now to the drawings, the tape cartridge 11 is shown as comprising a roller mounting ring 12 secured to base plate 14. The mounting ring is provided with a plurality of horizontal bores 16 and indentations 18 for receiving an array of circumferentially spaced, radially extending, tape support rollers 20. The idler rollers 20 are rotatably mounted in duplex, low radial play bearings 22, positioned in horizontal bores 16 of the ring 12. A stud 23 extending from the inner edge of each roller and a nut 24 positioned on the threaded end of the stud prevent radial movement of the roller in the bearing. An end cap 26 fastened to the mounting ring is employed to retain the bearings in the bore.

Figure 2:
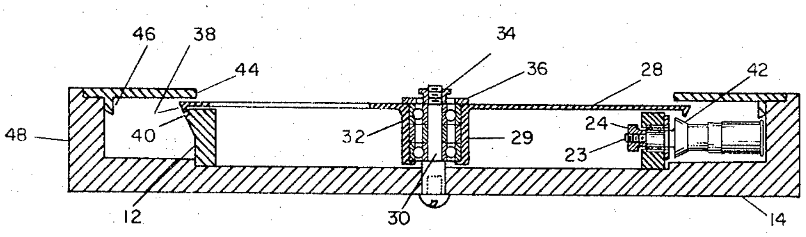
FIG. 2 is a vertical sectional view of the cartridge taken along line 2—2 of FIG. 1.

A circular tape reel 28 having a hub 29 is rotatably mounted about a shaft 30 through duplex bearings 32. The reel shaft 30 is securely fastened in the base plate 14. A preload nut 34 and end cap 36 are employed to prevent vertical movement of the reel and bearings. The tape reel 28 is concentrically mounted with respect to the roller mounting ring 12. The periphery of the circular tape reel is provided with a depending tapered surface 38 which is cooperatively aligned with a peripheral groove 40 formed in the upper edge of the roller mounting ring 12. The depending tapered surface 38 is also adapted to overlie the inclined surface 42 formed on each of the idler rollers 20, as best shown in FIG. 2.

An annular tape-cover plate 44 having a depending projection 46 is positioned on circumferential flange 48 extending upwardly from the base plate 14. The cover plate 44 and mounting ring 12 may be secured to base plate 14 by conventional threaded fasteners (not shown). A plurality of guide rollers 50 are rotatably mounted in the cover plate to restrict vertical displacement of the tape pack stored in the cartridge. The rollers 50 may be designed to conform to the shape of rollers 20 if desired. A pair of slots 52, 54 are provided in the cover plate; the innermost tape convolution being drawn from the cartridge through the inner slot 52 and the tape returning to the cartridge through the outer slot 54 for rewinding about the outer layer of the tape pack 64 arranged about tape reel 28. A tapered guide 56 is positioned on the tape cover plate to assure proper alignment of the tape as it is led from the cartridge. A tape-guide roller assembly 58 assures correct alignment of the tape a it arrives at and leaves capstan assembly 60, 62. A tape recorder utilizing dual capstans for the tape drive means as schematically illustrated is fully described in my copending U.S. Patent application, Serial No. 319,892, filed October 29, 1963.

The spirally coiled tape pack 64 is wound onto the tape reel 28 by starting the first convolution around the edge of the reel and progressively winding the tape towards the outer edge of the tape support rollers until the full length of the tape is wound about the reel. The lower edges of the tape pack now rest on the tape support rollers. The cover plate is then placed thereover and the inner and outer ends of the tape are brought up through the plate slots 52, 54 and are spliced together to form a cross-over loop 65 which is threaded through the capstan assembly. In operation the innermost convolution of the tape is drawn from the pack through the inner slot 52 by the capstan assembly and after passing the magnetic heads of the recorder (not shown) is led back through the outer slot 54 and rewound about the outer layer of the tape pack.

Figure 3:
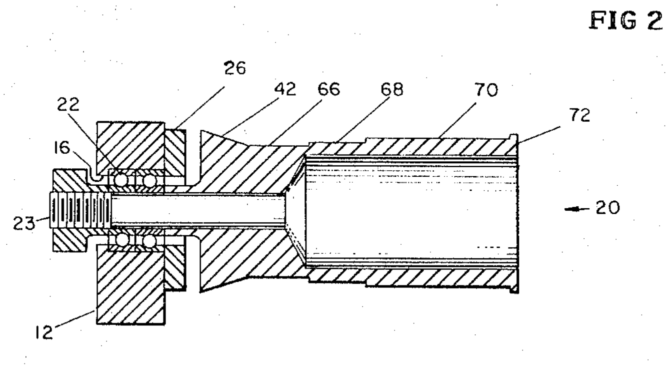
FIG. 3 is a sectional view taken along the longitudinal axis of a tape support roller of the cartridge.

In FIG. 3 the structural configuration of tape support rollers 20 of the preferred embodiment is illustrated. This novel configuration is an important feature of the present invention as will now be described. It is evident that as the tape is being led from the tape cartridge to the recording station and back to the outer convolution of the tape pack, each incremental portion of the spirally coiled tape must move at the same average linear speed. Also it is apparent, since each coil convolution has a slightly longer periphery than the next adjacent inner coil convolution, that in order to maintain the same linear speed in each convolution the angular velocity of the longer outer convolution must be slightly less than that of the adjacent inner convolution. This difference in angular velocity means that there must be relative movement or slippage between each of the adjacent coil convolutions, with resultant slippage friction. Further, from a consideration of the characteristics of a spiral coil it will be seen that there may be a tendency for the tape coil to contract and tighten upon itself due to nonuniform tape characteristics or momentary speed variations as the inner convolution is continually led off, resulting in a further increase in the frictional contact.

These frictional forces existent in an uncompensated tape pack are a major factor in limiting the maximum amount of tape which may be stored, and also may be sufficient to seriously impair the specially treated tape surface, to introduce fluctuations into the tape, and in some instances cause sufficient stress to break the tape. The rollers 20 of the instant tape cartridge are constructed so as to decrease the slippage friction between adjacent convolutions, while at the same time exerting a frictional drag on the lower edges of the tape convolutions to facilitate smooth and uniform rewinding of the tape on the reel. This frictional drag also serves to prevent slack or looseness from occurring in the tape as it is led from the capstan assembly back to the cartridge for rewinding about the tape pack.

Each of the tape support rollers 20, as illustrated in FIG. 3, is provided with a series of steps 66, 68 and 70 extending outwardly from the inclined surface 42 and progressively increasing in diameter in the radially outward direction.

Although three steps are shown in the illustration of FIG. 3, it is to be understood that the number of steps employed on the rollers of a particular cartridge and the diameter thereof may be selectively varied, depending primarily on the length and thickness of tape to be stored. Also, in another embodiment (not illustrated), the roller surface extending outwardly from the first step 66 consisted of a continuous curvilinear surface progressively increasing in diameter in the radially outward direction. An outer rim 72 is provided on the roller 20 to guide the outer convolution of the tape and to restrain further outward movement thereof.

Inasmuch as each roller 20 is an integral unit all points on the roller surface, regardless of radial position, rotate at the same angular velocity. However, the linear speed of each point on the roller surface will increase in proportion to the circumferential length of the surface at the point. Therefore, the surface portion of each outer step has a slightly greater linear speed than the surface portion of the adjacent inner step which is of a lesser diameter. Accordingly, when the idler rollers 20 are set in rotation by the drawing off of the innermost convolution of tape, the steps of the rollers will impart to the tape convolutions supported in frictional contact thereon a force tending to increase the linear speed of the convolutions correspondingly with the increase in step diameter. This force tending to increase the linear speed of the coil convolutions will in turn tend to expand the coil convolutions radially away from the coil center, thereby reducing the frictional contact and the resultant slippage friction forces between adjacent convolutions. It will also be noted that in addition to imparting expansion or loosening forces to the coil convolutions, the steps on the roller also serve to reduce frictional contact between adjacent convolutions by supporting adjacent segments of the coil pack at progressively varying levels.

As previously stated, the idler rollers 20 exert a frictional drag on the outer layers of tape which together with the residual slippage friction forces between adjacent coil convolutions rewinds the tape about the reel. To further increase the frictional drag of the rollers on the coil convolutions supported thereon, the outermost steps may have their surfaces roughened through techniques such as sand blasting so as to increase the frictional contact, and therefore drag, between the roller surface and the coil.

To further facilitate understanding the instant invention, one exemplary embodiment constructed in accordance with the foregoing principles will now be briefly described. The tape cartridge has an overall diameter of approximately ten inches and was formed of lightweight aluminum. The tape reel had a diameter of approximately seven inches. Twelve aluminum idler rollers approximately 1.3 inches in length were utilized; the steps having the increasing diameters of .500, .515 and .530 inch. The raised outer rim was .563 inch. The inner edge of the roller was inclined at an angle of 18° and the reel periphery was tapered at 25°. Each roller was formed hollow to reduce weight, and the stud for mounting the roller in the stationary ring was formed separately of stainless steel and press fit into the roller. The cartridge was designed to hold 1200 feet of .0015 inch thick, ¼ inch wide lubricated magnetic tape.

It is evident from the above description of the tape cartridge comprising the instant invention that a reliable and durable cartridge having a larger tape handling capacity than has previously existed; having a reduced amount of frictional contact between adjacent convolutions of the tape coil; requiring no positive driving means for the cartridge components; having excellent high-speed operating characteristics; and being compact and lightweight has been provided.

Obviously numerous modifications and variations of the present invention are possible in the light of the above teaching. It is therefore to be understood that within the scope of the appended claims the invention may be practiced otherwise than as described herein.

What is claimed as new and desired to be secured by Letters Patent of the United States is:

1. A tape cartridge for a spirally coiled, endless-loop tape which is continuously unwound from the inner convolution thereof and rewound on the outer convolution thereof comprising: a stationary circular member; an array of tape support rollers circumferentially spaced about said member; said rollers being mounted for idle rotation in said member and extending radially therefrom; each of said rollers being provided with an inclined surface on its radially inner end; a circular tape reel positioned concentrically with respect to said member with the periphery of said tape reel being a depending, tapered surface; means for mounting said tape reel for idle rotation with respect to said stationary circular member; the tapered surface of said tape reel overlying the inclined surface of said rollers, whereby a spirally coiled tape may be wound about said tape reel with the edges of the tape convolution resting on said tape support rollers and where binding of the tape as the innermost convolution is led off from the tape cartridge is eliminated.

2. A tape cartridge as defined in claim 1 wherein the roller surface of each of said array of rollers comprises: a series of steps extending outwardly from said inclined surface; said steps progressively increasing in diameter from the radially inner end to the outer end of the roller.

3. A tape cartridge as defined in claim 2, and further comprising: a tape cover plate; means for positioning said cover plate in spaced relationship to said tape support rollers; said plate having inner and outer slots formed therein for passage of the inner and outer ends of the spirally coiled tape therethrough.

4. A tape cartridge as defined in claim 3, and further including: a plurality of guide rollers rotatably mounted in said cover plate to restrict vertical displacement of the spirally coiled tape wound about said tape reel.

5. In a tape cartridge for a spirally coiled, endless-loop tape, a tape support mechanism comprising: a circular member; an array of tape support rollers circumferentially spaced about said member; said rollers being rotatably mounted in said member and extending radially therefrom; each of said rollers having an inclined surface on its radially inner end to facilitate unwinding of the tape from the tape cartridge; each of said array of rollers having a peripheral surface progressively increasing in diameter in the radially outward direction, whereby a spirally coiled tape pack may be supported with the edges of the tape convolutions resting on the peripheral surfaces of said array of rollers.

6. A mechanism as defined in claim 5 wherein: said peripheral surface consists of a series of steps; said steps progressively increasing in diameter in the radially outward direction.

7. A mechanism as defined in claim 6 wherein: each of said tape support rollers further includes a raised rim on its radially outer end to guide the outermost tape convolution.

8. A mechanism as defined in claim 6 wherein certain of the outer step surfaces are roughened so as to increase the frictional drag of the rollers on the tape convolutions passing thereover.

References Cited by the Examiner

UNITED STATES PATENTS

| | | | |
|---|---|---|---|
| 2,272,413 | 2/1942 | Links et al. | 242—55.19 |
| 2,740,628 | 4/1956 | Small | 242—55.19 |
| 2,917,308 | 12/1959 | Woelfel | 242—55.19 |
| 2,918,536 | 12/1959 | Appert et al. | 242—55.19 X |
| 2,964,256 | 12/1960 | Gorey | 242—55.19 |
| 3,140,837 | 7/1964 | Cailliot | 242—55.19 |

FOREIGN PATENTS

| | | |
|---|---|---|
| 309,801 | 4/1929 | Great Britain. |

FRANK J. COHEN, *Primary Examiner.*

MERVIN STEIN, *Examiner.*

B. S. TAYLOR, *Assistant Examiner.*